United States Patent [19]

Bertolet

[11] Patent Number: 5,694,452
[45] Date of Patent: Dec. 2, 1997

[54] EMERGENCY TELECOMMUNICATION DEVICE

[76] Inventor: Eric E. Bertolet, P.O. Box 1293, Prairieville, La. 70769

[21] Appl. No.: 615,113

[22] Filed: Mar. 14, 1996

[51] Int. Cl.⁶ .................................................. H04M 11/04
[52] U.S. Cl. .......................... 379/51; 379/42; 379/38
[58] Field of Search ....................... 379/38–51; 340/514, 340/505, 518, 531, 539, 825.06, 825.05, 825.54, 825.72

[56] References Cited

U.S. PATENT DOCUMENTS

| | | | |
|---|---|---|---|
| 3,598,919 | 8/1971 | Lott | 179/5 |
| 3,632,879 | 1/1972 | Freisinger | 179/5 |
| 3,683,114 | 8/1972 | Egan et al. | 179/5 |
| 4,760,593 | 7/1988 | Shapiro et al. | 379/38 |
| 5,195,126 | 3/1993 | Carrier et al. | 379/45 |
| 5,305,370 | 4/1994 | Kearns et al. | 379/38 |
| 5,309,506 | 5/1994 | Alexander | 379/45 |
| 5,343,509 | 8/1994 | Bounies | 379/40 |

*Primary Examiner*—Wing F. Chan
*Attorney, Agent, or Firm*—Joseph N. Breaux

[57] ABSTRACT

An emergency telecommunications device comprising a telecommunications control circuit having an automatic dialing circuit preprogrammed to dial 911; a digital-to-analog voice circuit to transmit one of three predetermined messages to an emergency operator when the control circuit is activated by one of three activation buttons: a medical emergency activation control button, a fire activation control button, and a police activation control button; and a touch tone decoding circuit that allows an emergency operator to play first and second user programmable messages and to control various functions of the telecommunications device. The fire, medical emergency and police control activation buttons are normally covered by a pivoting lid member. Closure of the lid member actuates a device activation control switch. When the lid member is in a fully closed position the telecommunications device is in the OFF state. When the lid member is in a partially or fully open position the telecommunications device is the ON state.

4 Claims, 2 Drawing Sheets

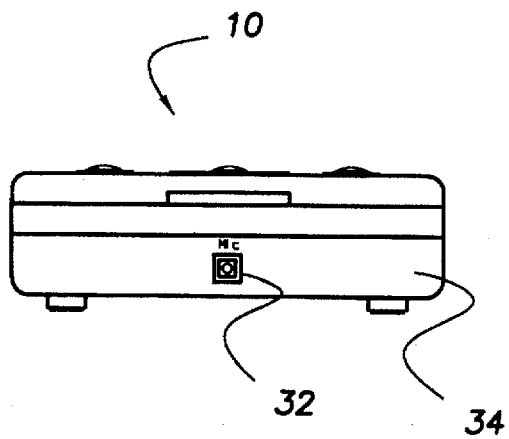
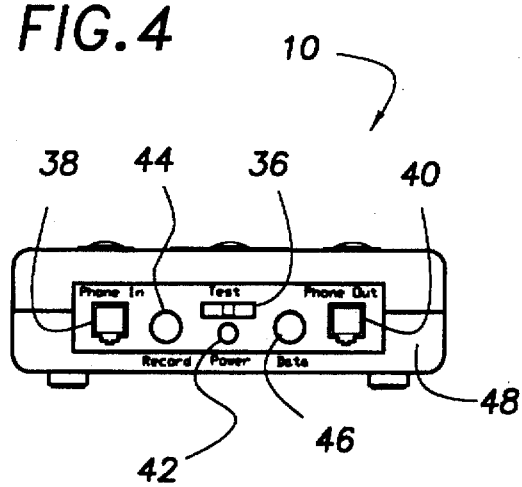
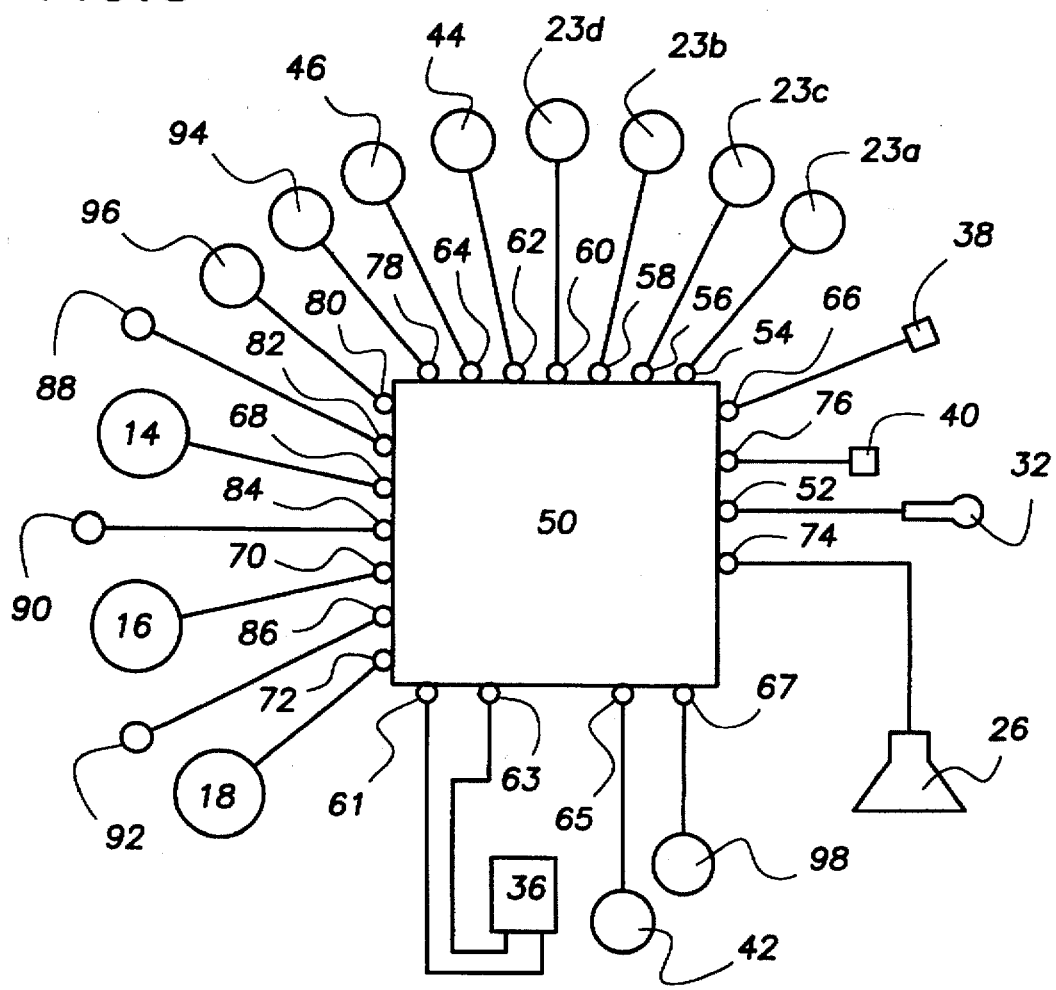

EMERGENCY TELECOMMUNICATION DEVICE

TECHNICAL FIELD

The present invention relates to automatic dialing, emergency telecommunications devices and more particularly to an automatic dialing, emergency telecommunications device that allows an emergency operator to select from a variety of pre-programed messages to obtain additional information during an emergency.

BACKGROUND ART

During an emergency, time is of the essence. The ability to summon help in a fast and efficient manner can mean the difference between life and death. It would be a benefit, therefore, to have an emergency telecommunications device activated by an individual needing emergency assistance that could provide an emergency dispatcher with the necessary information to speed assistance to the location as soon as possible. In addition, because emergency dispatchers are required to prioritize emergencies it would be a benefit if the telecommunications device included a mechanism for preventing accidental activation so that emergency dispatchers could have a higher degree of confidence when dispatching emergency personnel to a location based solely on a request from an automatic emergency telecommunications device.

It is also a problem that children will call the emergency dispatch number 911 as a prank or out of curiosity. When an operator answers, the child panics and hangs up. The number of such calls received is a problem and calls where the operator receives a hang up are given a lower priority. It would be a benefit, therefore, to have an emergency telecommunications device that, once activated, could not be hung up by the user and that required an emergency dispatcher to remotely disconnect the phone line.

Also, because special circumstances may exist at a location, it would be desirable if the emergency telecommunications device included at least one user programmable message that could be activated by an emergency dispatcher to obtain additional site specific information such as specific directions to the location, medical information about individuals residing at the location, and any special fire hazards existing at the location.

GENERAL SUMMARY DISCUSSION OF INVENTION

It is thus an object of the invention to provide an emergency telecommunication device that can be activated by an individual needing emergency assistance that provides an emergency dispatcher with the necessary information to speed assistance to the location as soon as possible.

It is a further object of the invention to provide an emergency telecommunication device that includes a mechanism for preventing accidental activation.

It is a still further object of the invention to provide an emergency telecommunication device that, once activated, can not be hung up by the user and that requires an emergency dispatcher to remotely disconnect the phone line.

It is a still further object of the invention to provide an emergency telecommunication device that can be activated by an emergency dispatcher to obtain additional site specific information.

It is a still further object to provide an emergency telecommunication device that achieves all or some of the above objects in combination Accordingly, an emergency telecommunications device is provided. The emergency telecommunications device comprises a telecommunications control circuit having an automatic dialing circuit preprogrammed to a preprogrammed emergency number, such as 911, and a digital-to-analog voice circuit to transmit one of three predetermined messages to an emergency operator when the control circuit is activated by one of three activation buttons: a medical emergency activation control button, a fire activation control button, and a police activation control button. Each activation control button is keyed to a specific message that corresponds to the type emergency indicated by the button. Exemplary prerecorded messages are, respectively: "There is a medical emergency at this location please send emergency medical services to this location", "There is a fire at this location please send the fire department" and "There is an emergency at this location that requires police assistance, please dispatch the police to this location."

The telecommunications device also includes a touch tone decoding circuit that allows an emergency operator to play first and second user programmable messages and to control various functions of the telecommunications device, such as activating a microphone that allows the operator to listen to what is going on at a specific location and activating a speaker that allows the operator to make an audible announcement by pressing predetermined keys on a telephone keypad. The first user programmable message is preferably dedicated to directions to the location where the emergency telecommunications device is located. The second user programmable message is preferably dedicated to other-information such as the position and type of hazardous conditions within the location, and/or information relating to the specialized medical conditions of individuals residing at the location.

Each of the fire, medical emergency and police control activation buttons is surrounded by a raised ridge to prevent accidental depression of the control activation buttons. The fire, medical emergency and police control activation buttons are normally covered by a pivoting lid member. Closure of the lid member actuates a device activation control switch. When the lid member is in the fully closed position the telecommunications device is in the OFF state. When the lid member is in an open position the telecommunications device is in the ON state. Thus opening the lid member turns the emergency telecommunications device ON and closing the lid member turns the emergency telecommunications device OFF.

The telecommunications device is also preferably equipped with a backup battery power source connection to allow for connection of a backup battery. With the backup battery installed power outages will not effect operation of the device.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is a plan view of the front panel of the exemplary emergency telecommunications device showing the built-in microphone.

FIG. 4 is a plan view of the rear panel of the exemplary emergency telecommunications device showing the three-position message test switch, the phone-IN jack, the phone-OUT jack, the AC adaptor jack, the directions record activation button, and the other-information record activation button.

FIG. 5 is a schematic diagram of the exemplary emergency device showing the various input and output ports of the telecommunications control circuit.

EXEMPLARY MODE FOR CARRYING OUT THE INVENTION

Figure 1:
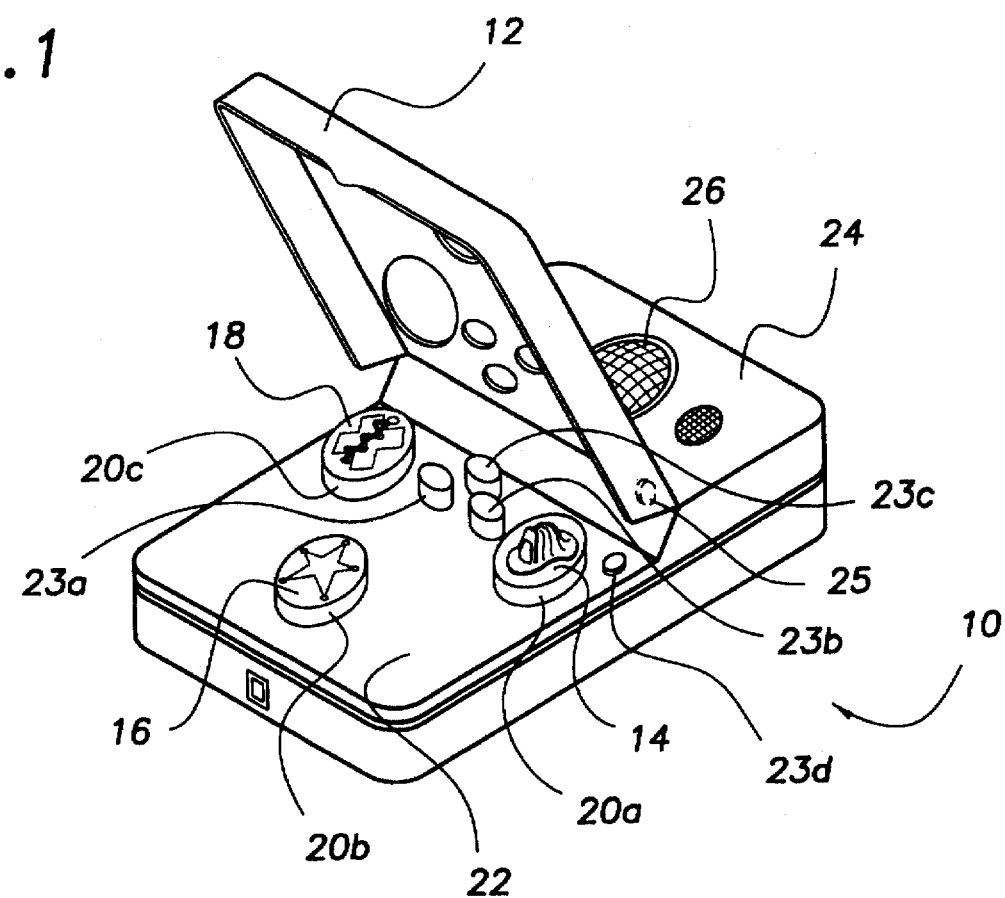
FIG. 1 is a perspective view of an exemplary embodiment of the emergency telecommunications device of the present invention with the flip up lid member in a raised position showing the illuminated fire, police, and medical emergency activation buttons; the device activation switch and the device activation protrusion; and the silent mode, the audible mode and the message override mode switches.

FIG. 1 shows an exemplary embodiment of the emergency telecommunications device of the present invention generally designated by the numeral 10. In this view, a flip up lid member 12 is in a raised position showing a fire activation button 14, a police activation button 16, and a medical emergency activation button 18. In this embodiment, fire activation button 14, police activation button 16, and medical emergency activation button 18 are illuminated momentary contact switches having a light bulb housed within a translucent plastic shell. Each plastic shell has indicia molded thereon to indicate the nature of each activation button 14,16,18.

Each activation button 14,16,18 is surrounded by a raised ridge portion 20a,20b,20c that extends outward from a molded plastic activation button housing panel 22 a distance of about one-eighth (⅛") inch. Also provided on activation button housing panel 22 is a silent mode switch 23a, an audible mode switch 23b, a message override mode switch 23c, and a device activation switch 23d. Silent mode switch 23a, audible mode switch 23b, message override mode switch 23c, and device activation switch 23d are momentary contact type switches.

Figure 2:
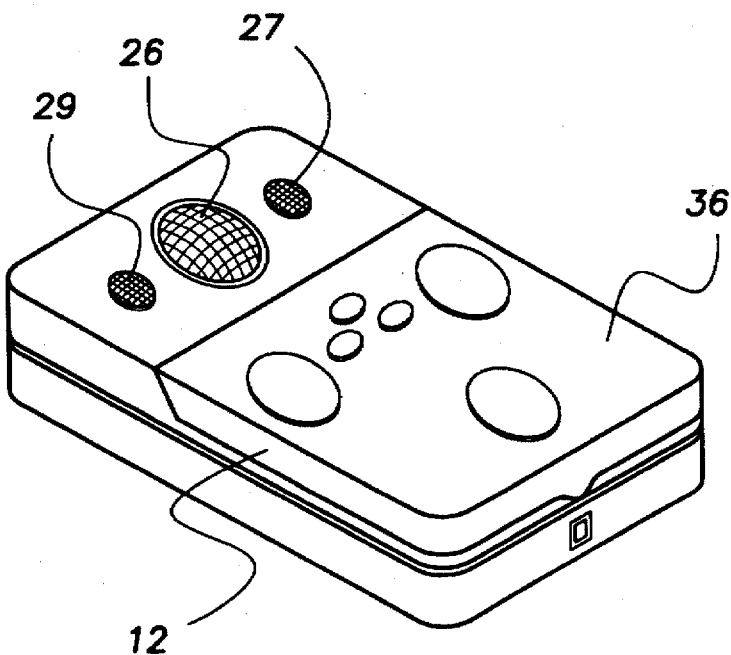
FIG. 2 is a perspective view of an exemplary embodiment of the emergency telecommunications device of the present invention with the flip up lid member in the down position showing the speaker, the battery indicator light and the power indictor light.

Flip up lid member 12 is hingedly attached to an outer speaker panel 24 having a speaker 26 installed therein. A device activation protrusion 25 extends outwardly from an interior surface of flip up lid member 12 and depresses device activation switch 23d and turns OFF emergency telecommunication device 10 when flip up lid member 12 is in the closed position shown in FIG. 2. With further reference to FIG. 2, a backup battery indicator light 27 and a power indicator light 29 are positioned on either side of speaker 26. The backup battery indicator light is illuminated when a backup battery is installed. The power indicator light indicates that power is being received through an AC adaptor jack 42 (Shown in FIG. 4).

FIG. 3 is a front view of telecommunication device 10 showing a microphone 32 located on a front panel of device housing 34. FIG. 4 is a rear view of telecommunication device 10 showing a three-position message test switch 36, a phone-IN jack 38, a phone-OUT jack 40, an AC adaptor jack 42, a directions record activation button 44, and an other-information record activation button 46 located on a rear panel 48. Phone-in jack 38 and phone-out jack 40 are conventional phone jacks. Directions record activation button 44, and other-information record activation button 46 are momentary contact switches.

FIG. 5 is a schematic representation of a telecommunications control circuit 50 having a conventional automatic dialing circuit preprogrammed to dial 911 and a conventional digital-to-analog voice circuit. Although in this embodiment the automatic dialing circuit is preprogrammed to dial. 911, it should be understood that any emergency number designated by a user may be preprogrammed into the automatic dialing circuit. Control circuit 50 also includes a touch tone telephone decoding circuit that allows an operator to control operation of telecommunications device 10 from a telephone keypad. Control circuit 50 has the following input ports: an analog microphone input 52, a silent mode control input 54, a message override mode control input 56, an audible mode control input 58, a device activation control input 60, a directions message control test input 61, a directions message control input 62, an other-information message test input 63, an other-information message control input 64, an AC adaptor input 65, a phone-in jack input 66, a backup battery input 67, a fire activation input 68, a police activation input 70, and a medical emergency activation input 72; and the following outputs: a speaker output 74, a phone-out jack output 76; a battery indicator light output 78, a power indicator light output 80, a fire activation button illumination light output 82, a police activation button illumination light output 84, a medical emergency activation button illumination light output 86. Microphone 32 is in electrical connection with microphone input 52 in a manner to transfer the output from microphone 32 to control circuit 50. Speaker 26 is in electrical connection with speaker output 74 in a manner to allow control circuit 50 to transfer analog signals to speaker 26 for audible play.

Fire activation button momentary contact switch 14 is in electrical connection with fire activation input 68. A first light bulb 88 is in electrical connection with fire activation button illumination light output 82.

Police activation button momentary contact switch 16 is in electrical connection with police activation input 70. A second light bulb 90 is in electrical connection with police activation button illumination light output 84.

Medical emergency activation button momentary contact switch 18 is in electrical connection with medical emergency input 72. A third light bulb 92 is in electrical connection with medical emergency activation button illumination light output 86.

Silent mode activation switch 23a is in electrical connection with silent mode control input 54. Message override mode activation switch 23c is in electrical connection with message override mode control input 56. Audible mode activation switch 23b is in electrical connection with audible mode control input 58. Device activation switch 23d is in electrical connection with device activation control input 60.

The three position message test activation switch 36 has one terminal in electrical connection with directions message test control test input 61 and a second terminal in electrical connection with other-information message test input 63.

Phone-IN phone jack 38 is in electrical connection with phone-in jack input 66. Phone-OUT phone jack 40 is in electrical connection with phone-out jack output 76.

Directions record activation button momentary contact switch 44 is in electrical connection with directions message control input 62. Other-information record activation button momentary contact switch 46 is in electrical connection with other-information message control input 64.

A fourth light bulb 94 is in electrical connection with battery indicator light output 78. A fifth light bulb 96 is in electrical connection with power indicator light output 80. AC adaptor jack 42 is in electrical connection with AC adaptor input 65. A battery connector 98 is in electrical connection with backup battery input 67.

Installation and set up of emergency telecommunications device 10 is now described with general reference to FIG. 1-5. Emergency telecommunications device 10 is set up for use in the following manner. A backup battery is installed in battery connector 98 to provide backup power. Installation of the backup battery provides electrical power to control circuit 50 and signals control circuit 50 to energize battery indicator light output 78, thereby, causing fourth light bulb 94 to illuminate.

The male plug from a plugged in AC power adapter is then inserted into AC adapter jack 42. Installation of the male plug provides electrical power to control circuit 50, and causes control circuit 50 to energize power indicator light output 80, thereby, causing fifth light bulb 96 to illuminate. When electrical power is being supplied from the AC adaptor, the backup battery is disconnected and does not supply power to control circuit 50.

Emergency telecommunications device 10 can be installed between an existing phone and an existing phone jack by installing the output plug of the existing phone cord into phone-IN jack 38, one plug of a convention phone cord into phone-OUT jack 40 and the other end of the conventional phone cord into the existing phone jack. If it is not desired to install telecommunications device 10 between an existing phone and an existing phone jack, telecommunications device 10 can also be installed directly to an existing phone jack by installing one plug of a convention phone cord into phone-OUT jack 40 and the other end of the conventional phone cord into the existing phone jack. When telecommunication device 10 is not in use, control circuit 50 connects phone-OUT jack 40 directly to phone-IN jack 38. Telecommunications device 10 disconnects phone-OUT jack 40 from phone-IN jack 38 prior to dialing 991.

If desired, a directions message and an other-information message can now be stored. The directions message is stored by depressing and holding directions record activation button momentary contact switch 44 and speaking the directions into microphone 32. The other-information message is stored by depressing and holding other-information record activation button momentary contact switch 46 and speaking the other-information into microphone 32.

The user can listen to his/her directions message by momentarily pushing three position message test activation switch 36 to a first position toward directions record activation button momentary contact switch 44. When directions message test control input 61 detects that three position test activation switch 36 has been moved to the first position, control circuit 50 outputs the directions message to speaker 26 through speaker output 74.

The user can listen to his/her other-information message by momentarily pushing three position message test activation switch 36 to a second position toward other-information record activation button momentary contact switch 46. When other-information message test control input 63 detects that three position test activation switch 36 has been moved to the second position, control circuit 50 outputs the other-information message to speaker 26 through speaker output 74.

Operation of emergency telecommunications device 10 is now described with reference to FIGS. 1-5. Emergency telecommunication device 10 operates in three (3) modes—silent mode, audible mode, and message override mode. In use, the user is allowed to select an operating mode prior to depressing fire activation button momentary contact switch 14, police activation button momentary contact switch 16, or medical emergency activation button momentary contact switch 18. If no mode is selected, control circuit 50 automatically selects the silent mode as the default mode.

In the silent mode, control circuit 50 only outputs the message to phone-OUT jack 40—no output signal is transmitted to speaker 26 from speaker output 74. Operation in the silent mode is, therefore, silent at the location. This mode is useful in situations such as when a person within a residence believes or knows an unauthorized intruder is present.

In the audible mode, control circuit 50 outputs the same signals to both phone-OUT jack 40 and to speaker 26 via speaker output 74. This allows the user to audibly verify the message transmitted to the emergency operator.

In the message override mode, control circuit 50 dials the 911 number and then opens microphone input 52 and speaker output 74 but does not transmit the prerecorded message. In the message override mode emergency telecommunications device 10 operates in the same fashion as a speaker phone.

Emergency telecommunications device 10 is activated by lifting flip up lid member 12 a sufficient amount to disengage device activation protrusion 25 from depressing device activation switch 23d. When device activation control input 60 detects the lifting of the lid member 12, control circuit 50 is activated.

Once control circuit 50 is activated, an emergency message can be transmitted by depressing fire activation button momentary contact switch 14, police activation button momentary contact switch 16, or medical emergency activation button momentary contact switch 18. Once fire activation button momentary contact switch 14, police activation button momentary contact switch 16, or medical emergency activation button momentary contact switch 18 has been depressed, control circuit 50 remains active until all power sources have been removed or an emergency operator turns telecommunications device 10 OFF by hanging up.

The emergency operator can also remotely control other functions of control circuit 50 via the emergency operator's keypad. When the operator presses the number one (1), control circuit 50 activates microphone input 52 to allow the operator to hear what is going on at the location. When the operator presses the number two (2), control circuit 50 activates microphone input 52 and speaker output 74, thereby configuring emergency telecommunications device 10 to operate in the same fashion as a speaker phone.

When the emergency operator presses the number three (3), control circuit 50 retrieves and outputs the directions message to telephone-OUT jack 40 via telephone-OUT jack output 76. When the emergency operator presses the number four (4), control circuit retrieves and outputs the other-information message to telephone-OUT jack 40 via telephone-OUT jack output 76.

It can be seen from the preceding description that an emergency telecommunication device has been provided that can be activated by an individual needing emergency assistance that provides an emergency dispatcher with the necessary information to speed assistance to the location as soon as possible; that includes a mechanism for preventing accidental activation; that, once activated, can not be hung up by the user and that requires an emergency dispatcher to remotely disconnect the phone line; and that can be activated by an emergency dispatcher to obtain additional site specific information.

It is noted that the embodiment of the emergency telecommunication device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An emergency telecommunication device comprising:

a telecommunications control circuit, in connection with a phone-OUT jack, having an automatic dialing circuit preprogrammed to dial an emergency telephone number; a digital-to-analog voice circuit adapted to transmit one of three predetermined messages to an emergency operator when said control circuit is activated by one of three activation buttons: a medical emergency activation control button, a fire activation control button, and a police activation control button; and a touch tone decoding circuit adapted to allow an emergency operator to play first and second user programmable messages and to control a microphone and a speaker that are interconnected to said control circuit, respectively, through a microphone input port and a speaker output port;

each said activation control button being keyed to a specific message that corresponds to a particular type emergency;

Each of said fire, medical emergency and police control activation buttons being disposed through apertures formed through a first activation button housing panel and being surrounded on sides thereof by a first, second and third ridge, respectively, that extends away from said first activation button housing panel a distance of about one-eighth (⅛") inch;

said fire, medical emergency and police control activation buttons being coverable by a pivoting lid member that engages a device activation control switch;

said device activation control switch being in electrical connection with said control circuit in a manner such that positioning said device activation control switch in a first position controls an ON/OFF state of said control circuit.

2. The emergency telecommunication device of claim 1, wherein:

said telecommunications device includes a backup battery power source connection.

3. The emergency telecommunication device of claim 1, wherein:

said telecommunications device further includes a silent mode activation switch in electrical connection with a silent mode control input of said control circuit;

a message override mode activation switch in electrical connection with a message override mode control input of said control circuit;

an audible mode activation switch in electrical connection with an audible mode control input of said control circuit; and said control circuit is adapted in a manner such that upon actuation of said silent mode activation switch said control circuit outputs all prerecorded messages exclusively to said phone-OUT jack; upon actuation of said audible mode activation control circuit outputs all prerecorded messages to said phone-OUT jack and to said speaker output port; and upon actuation of said message override control switch said control circuit activates said microphone input port and said speaker output port.

4. The emergency telecommunication device of claim 3 wherein:

said telecommunications device includes a backup battery power source connection.

* * * * *